(12) United States Patent
Letwin et al.

(10) Patent No.: US 11,893,323 B2
(45) Date of Patent: Feb. 6, 2024

(54) SYSTEMS AND METHODS FOR GENERATING SCENARIOS FOR AV SIMULATION USING PARAMETRIC MODELING

(71) Applicant: UATC, LLC, Pittsburgh, PA (US)

(72) Inventors: Nicholas G. Letwin, Pittsburgh, PA (US); Christopher Louis Marsh, Gibsonia, PA (US)

(73) Assignee: UATC, LLC, Pittsburgh, PA (US)

(*) Notice: Subject to any disclaimer, the term of this patent is extended or adjusted under 35 U.S.C. 154(b) by 399 days.

(21) Appl. No.: 17/092,237

(22) Filed: Nov. 7, 2020

(65) Prior Publication Data
US 2022/0108049 A1    Apr. 7, 2022

Related U.S. Application Data

(60) Provisional application No. 63/088,765, filed on Oct. 7, 2020.

(51) Int. Cl.
*G06F 30/20* (2020.01)
*G05D 1/02* (2020.01)
*G07C 5/02* (2006.01)
*G06F 111/04* (2020.01)

(52) U.S. Cl.
CPC .......... *G06F 30/20* (2020.01); *G05D 1/0212* (2013.01); *G06F 2111/04* (2020.01); *G07C 5/02* (2013.01)

(58) Field of Classification Search
CPC ... G06F 30/20; G06F 2111/06; G05D 1/0212; G07C 5/02
USPC .......................................................... 703/8
See application file for complete search history.

(56) References Cited

U.S. PATENT DOCUMENTS

| | | | |
|---|---|---|---|
| 7,424,414 B2 * | 9/2008 | Craft | G09B 9/04 703/8 |
| 2012/0109610 A1 * | 5/2012 | Anderson | B60W 50/0098 703/7 |
| 2019/0129831 A1 * | 5/2019 | Goldberg | G06F 3/04847 |

* cited by examiner

*Primary Examiner* — Mahmoud Gimie
(74) *Attorney, Agent, or Firm* — Dority & Manning, P.A.

(57) ABSTRACT

Systems and methods for using parametric modeling to design scenarios for autonomous vehicle simulation are provided. In particular, a computing system can obtain data identifying a plurality of parameters, each parameter associated with a particular scenario component. The computing system can determine values associated with a first set of parameters in the plurality of parameters. The computing system can determine one or more parameter relationships, such that values associated with a second set of parameters in the plurality of parameters are determined, at least in part, based on the values associated with the first set of parameters. The computing system can initiate a simulation of a scenario based, at least in part, on the values associated with the first set of the parameters and the one or more parameter relationships. The computing system can determine whether the simulated autonomous vehicle has successfully completed the scenario.

20 Claims, 9 Drawing Sheets

SYSTEMS AND METHODS FOR GENERATING SCENARIOS FOR AV SIMULATION USING PARAMETRIC MODELING

RELATED APPLICATION

This application claims priority to and the benefit of U.S. Provisional Patent Application No. 63/088,765, filed Oct. 7, 2020, which is hereby incorporated by reference in its entirety.

FIELD

The present disclosure relates generally to autonomous vehicles. More particularly, the present disclosure relates to using simulation systems to test autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through the surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more processors, scenario component data associated with a plurality of scenario components. The method can include obtaining, by the computing system, data identifying a plurality of parameters, each parameter in the plurality of parameters associated with a particular scenario component. The method can include determining, by the computing system, values associated with a first set of parameters in the plurality of parameters. The method can include determining, by the computing system, one or more parameter relationships, such that values associated with a second set of parameters in the plurality of parameters are determined, at least in part, based on the values associated with the plurality of parameters in the first set of parameters. The method can include initiating, by the computing system, a simulation of a scenario based, at least in part on the values associated with the first set of the parameters and the one or more parameter relationships. The method can include determining, by the computer system, based on one or more criteria whether the simulated autonomous vehicle has successfully completed the scenario.

Another example aspect of the present disclosure is directed to a computing system. The computing system can include one or more processors and one or more non-transitory computer-readable memories, wherein the one or more non-transitory computer-readable memories store instructions that, when executed by the processor, cause the computing system to perform operations. The computing system can obtain data identifying a plurality of parameters, each parameter in the plurality of parameters associated with a particular scenario component. The computing system can determine values associated with a first set of parameters in the plurality of parameters. The computing system can determine one or more parameter relationships, such that values associated with a second set of parameters in the plurality of parameters are determined, at least in part, based on the values associated with the plurality of parameters in the first set of parameters. The computing system can initiate a simulation of a scenario based, at least in part, on the values associated with the first set of the parameters and the one or more parameter relationships. The computing system can determine based on one or more criteria whether the simulated autonomous vehicle has successfully completed the scenario.

Yet another example aspect of the present disclosure is directed to an autonomous vehicle. The autonomous vehicle can obtain data identifying a plurality of parameters, each parameter in the plurality of parameters associated with a particular scenario component. The autonomous vehicle can determine values associated with a first set of parameters in the plurality of parameters. The autonomous vehicle can determine one or more parameter relationships, such that values associated with a second set of parameters in the plurality of parameters are determined, at least in part, based on the values associated with the plurality of parameters in the first set of parameters. The autonomous vehicle can initiate a simulation of a scenario based, at least in part, on the values associated with the first set of the parameters and the one or more parameter relationships. The autonomous vehicle can determine based on one or more criteria whether the simulated autonomous vehicle has successfully completed the scenario.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
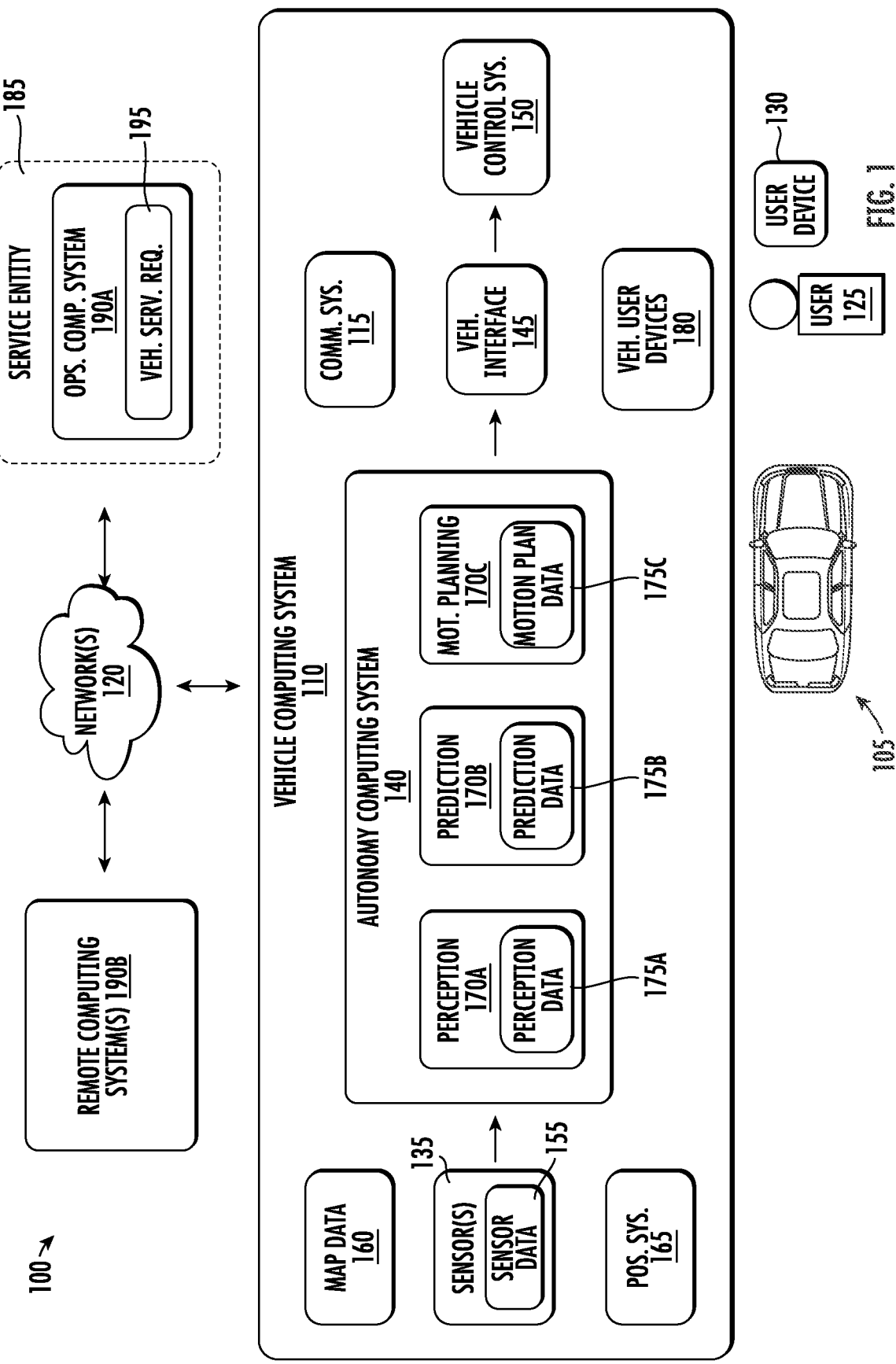
FIG. 1 depicts an example system for controlling the navigation of a vehicle according to example embodiments of the present disclosure.

Generally, the present disclosure is directed towards improving the simulation of specific scenarios for autonomous vehicle testing through the use of parametric scenario modeling. Simulations allow the rapid testing of autonomous vehicles while eliminating the safety concerns and cost of testing in a real-world environment. Simulation scenarios can be specific situations that can be tested by generating a simulated space in which an autonomous vehicle and one or more other objects can be simulated. A scenario can include a scene (e.g., details of the environments including the geographic location, the location of static obstacles and lane boundaries, etc.), one or more objects (e.g., the autonomous vehicle to be tested, other simulated actors (e.g., vehicles, bicyclists, animals, and so on), etc.), and one or more specific interactions planned to occur between the autonomous vehicle and by other simulated actors (e.g., other vehicles, pedestrians, and so on) or other elements in the scene (e.g., responding to a traffic control device) or a combination of interactions. Traditional scenario design techniques can result in scenarios that need to be updated each time a change is made to the components of the simulation (e.g., when the path planning system for the simulated autonomous vehicles or the predictions system for other actors is updated). The result is scenarios that are not tolerant of change and require significant time and expense to use as components of the simulation or scenario change, the control software is updated, and so on.

To overcome these challenges, the present disclosure describes a system for using parametric modeling to design flexible and useful scenarios. Using parametric modeling, scenarios can be built by receiving one or more scenario components. The scenario components can include an environment (or scene) for the specific simulation. The environment can include the characteristics of the three-dimensional environment that the scenario will take place in, including, but not limited to, lane boundaries, applicable road laws, buildings or other static obstacles, and so on. The scenario components can include one or more objects in the scenario, including an autonomous vehicle to be simulated and one or more other actors. The scenario components can also include data describing how the autonomous vehicle will be controlled during the simulation. The scenario components can also include data describing one or more interactions between the autonomous vehicle and one or more other scenario components.

The simulation system can determine a plurality of parameters associated with the scenario components. For example, each object can be associated with a particular position, velocity, and heading. In addition, parameters can be associated with interactions, describing when and how objects and actors interact with the simulated autonomous vehicle. For example, a specific scenario can include testing whether the autonomous vehicle reacts appropriately to an actor moving into the lane of the autonomous vehicle. Thus, a parameter can include the distance between the autonomous vehicle and the actor when the actor enters the lane.

Once parameters have been determined, the simulation system can discretize the parameters to obtain particular values. In some examples, a user can submit specific values. In other examples, the simulation system can determine a range of potential values and generate a plurality of values by stepping through the range with a particular increment. In yet another example, the simulation system can generate a plurality of values by attempting to optimize a resulting parameter. For example, the simulation system can generate a plurality of values within a range and use each in a simulation to determine which value reaches a particular result. For example, the simulation system can test different parameter values to identify one or more parameter values that result in the autonomous vehicle failing to overcome the scenario. This value can then be used to determine whether future improvements to the autonomous vehicle system have been successful.

Some parameters can have a value associated with the values of one or more other parameters. For example, the distance between the autonomous vehicle and the actor when the actor enters the lane can be based, at least in part, on the speed of the autonomous vehicle.

Once the values for one or more parameters have been determined and any relationships between the parameters have been established, the simulation system can then initiate a simulation of the scenario in a simulated environment. The simulation can run the scenario a plurality of times to iterate through the possible parameter values or until a specific parameter is optimized to achieve a particular result. Each instance of the simulation can be evaluated to determine whether the autonomous vehicle meets one or more criteria during the simulation.

The simulation system is used to test the functionality of autonomous vehicles, including the vehicle computing systems included in the autonomous vehicles (e.g., ground-based vehicle, aerial vehicle, etc.). The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

To accomplish these operations, the autonomy computing system can include, for example, a perception system, a prediction system, and a motion planning system. Many of the functions performed by the perception system, prediction system, and motion planning system can be performed, in whole or in part, by one or more machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to the structured machine-learned model(s). In addition or alternatively, the autonomous vehicle can access map data (e.g., high definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment.

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system. The vehicle computing system can use the perception data, prediction data, map data, and/or other data to generate a motion plan for the vehicle.

Control of autonomous vehicles can thus involve a large amount of complexity and can be expected to need to adequately deal with a variety of situations and scenarios while traveling. One method of testing the various systems of the autonomous vehicle can include simulating a plurality of scenarios within a simulated environment created by a simulation system. The autonomous vehicle can be evaluated to determine whether the autonomous vehicle performs adequately in these scenarios.

A simulation system can generate a simulated environment in which a simulation of an autonomous vehicle can simulate performing in one or more scenarios designed to determine whether the autonomous vehicle performs as expected in a safe, isolated, and consistent testing environment. A simulated scenario can include three layers. The first layer can be a scene layer. A scene layer can include scene data describing the spatial layout of the scenario with respect to the driving surface and immediate surroundings. For example, the scene layer can include information about the geographic location and features in which the scenario will occur. In some examples, the scene data can be based on a real location using map data. In other examples, a location can be generated automatically or supplied by a user. The geographic location data can include information about the topology of the environment (e.g., from map data), the location of one or more static obstacles (e.g., buildings, other infrastructure, etc.), the location of lanes and lane boundaries, crosswalks, traffic control devices (e.g., lights and/or signs), and any information about applicable traffic laws (e.g., speed limits, passing rules, etc.).

The second layer can include object data. Object data can describe the location and characteristics of moveable actors and/or objects within the scenario. Note that an object might not move, but as long as it can move it will generally be described in the second layer rather than the first layer. In some examples, object data can describe the autonomous vehicle that is being simulated, including its initial state, the location of one or more other vehicles, pedestrians, bicyclists, animals, and so on. The second layer (e.g., object layer) can also include data describing the object trajectories of all objects in the scenario. Note that a non-moving object can have a null trajectory.

The third layer can describe one or more key interactions between the simulated autonomous vehicle and one or more other objects in the simulated scenario. For example, the interaction layer (the third layer) can describe a transit route (e.g., a route for the simulate autonomous vehicle that includes no defined interaction with other objects), right of way data, action, distance, or time-based triggers, and data describing interactions that are based on the state of the simulated autonomous vehicle. For example, an interaction can cause a specific event (e.g., an object beginning to move) to occur when the autonomous vehicle reaches a particular point on a simulated travel path.

The scenario can be simulated in a simulation system. The simulated system can create a simulated environment based on the scene layer, populate it with objects based on the object layer, and cause them to interact based on the interaction layer.

The use of scenario simulations can allow autonomous vehicles to be tested quickly, safely, and consistently. Each scenario can be designed to test one or more aspects of the autonomous vehicle system. However, simulation scenarios that are designed with fixed values may fail to accurately provide evaluations of the autonomous vehicle when one or more aspects of the autonomous vehicle are updated. For example, if a new version of the software of an autonomous vehicle is released, the specific arrangement of objects and interactions may no longer create the scenario that the designer wishes to test. This can result in the need to manually revise each scenario when changes are made to the simulated autonomous vehicle or another component of the simulation system.

In some examples, parametric modeling can be used to generate scenarios that are flexible enough to provide consistent testing as one or more characteristics of the autonomous vehicle change (e.g., different vehicle platforms, software version changes, differences in desired responses, and so on).

Parametric modeling can include parameterizing one or more characteristics of the objects in the simulated environment, discretizing the parameters, determining one or more relationships between one or more parameters, and assigning values to the parameters (which may be part of the discretizing step).

To parameterize a scenario, the system can obtain a list of one or more scenario components. Scenario components can include the components of the environment, one or more objects in the scenario, and/or the interactions between the objects and/or environment. The simulation system can determine a plurality of parameters associated with the scenario components. Parameters can be the set of measurable factors that define the scenario and determine its behavior and may be varied in the execution of the scenario.

Parameters can be organized into one or more general class types including, but not limited to, build-time parameters, run-time parameters, independent parameters, dependent parameters, object parameters, constrained parameters, and unconstrained parameters.

A build-time parameter can be a parameter that is assigned specific values when the scenario is initially created. For example, the simulated autonomous vehicle can be assigned an initial starting position. A runtime scenario parameter can be a parameter that is assigned at runtime (e.g., when the scenario is initialized). For example, the initial velocity and/or heading of the autonomous vehicle can be assigned at runtime to test different initial starting conditions.

Independent parameters can be parameters that are controlled by inputs. The first set of parameters in the scenario can be independent parameters. It should be noted that a particular parameter can have more than one class type. In some examples, independent parameters can also be either build-time parameters or run-time parameters. Dependent parameters can be parameters that are defined based on a relationship with an independent parameter. For example, if a scenario is designed to test the way an autonomous vehicle passes a slightly slower vehicle, the speed of the slower vehicle can be established to be 0.5 m/s slower than the simulated autonomous vehicle. As such, the speed of the slower vehicle is a dependent parameter that relies on another parameter, the speed of the simulated autonomous vehicle, to determine its value.

Objective parameters can be parameters that are sought to be optimized and are thus measured and evaluated. For example, a specific scenario can be designed to determine how close the autonomous vehicle comes to an object suddenly appearing into the road. The simulation system can measure the distance between the autonomous vehicle and the object at all times to determine how close the autonomous vehicle comes to the object. Thus the distance between the two can be an objective parameter. This objective parameter can be evaluated to determine how well the simulated autonomous vehicle performed during the simulated scenario, such that if the distance between the object and the simulated autonomous vehicle is too small, the simulated autonomous vehicle can be determined to have failed the scenario. Furthermore, the plurality of parameters may be varied such that the minimum or optimum value of an objective parameter is captured given the available independent parameters. This, the simulation system can identify a range of parameter values that achieve a desired result (e.g., either success to determine how autonomous vehicle should behave in the future or failure such that autonomous vehicle can be tested against the hardest test cases).

Constrained parameters can be parameters that have bounded possible values. For example, the velocity of a particular vehicle can be bounded below a certain maximum speed. Unconstrained parameters can be unbounded. For example, the total distance traveled by the autonomous vehicle may be unbounded.

In addition, parameters can be associated with interactions, describing when and how objects and actors interact with the simulated autonomous vehicle. For example, a specific scenario can include testing whether the autonomous vehicle reacts appropriately to a vehicle in front of the autonomous vehicle suddenly stopping. Thus, an objective parameter can describe the distance between the autonomous vehicle and the lead vehicle when the lead vehicle suddenly stops and can be measured and compared to a threshold distance by the simulation system.

In some examples, the parameters can be designated and be received by the simulation system via a communication interface. For example, a user can input a list of parameters into a user interface configured to allow parameters to be designated for a particular scenario. In other examples, the simulation system can automatically generate parameters based on the scenario data (e.g., environment, objects, and interactions) of the scenario to be simulated. For example, a pre-existing model library can include components that a user can employ to construct a scenario. Each component can include one or more predetermined parameters.

Once parameters have been determined, the simulation system can discretize the parameters to obtain particular values. In some examples, a user can submit specific values. In other examples, the simulation system can determine a range of potential values and generate a plurality of values by stepping through the range with a particular increment. In some examples, the simulation system can generate values based on a specific statistical distribution within a particular range. For example, the speed of the autonomous vehicle can be a constrained parameter that is bounded within a range (e.g., 30 mph to 60 mph). The scenario system can generate a plurality of values at 5 mph intervals within that range. The scenario can then use one or more of the plurality of values when executing the scenario (e.g., testing more than one initial value for a parameter (e.g., a run-time parameter) can require multiple instances of the scenario being run as the parameter can only be assigned one value for a given instance of the simulated scenario).

Some parameters (e.g., dependent parameters) can have a value associated with the values of one or more other parameters. For example, the distance between the autonomous vehicle and the actor when the actor enters the lane can be based, at least in part, on the speed of the autonomous vehicle. Thus, one parameter can have a value that is based, at least in part, on the value associated with another parameter.

By associating some parameter values with other parameters rather than hardcoding their values, the scenario can be made more resilient to changes to the characteristics of one or more objects in the simulation. For example, if the autonomous vehicle being simulated changes such that the vehicle itself has a higher acceleration, the simulated autonomous vehicle may travel to a specific point more quickly. If an obstacle was hard-coded to move such that it obstructed the path at a particular time in the simulation, the faster vehicle may avoid the intended situation within the scenario altogether. This may cause the simulation to fail (or report failure) when no such failure has occurred. Using parametric modeling, the movement of the obstacle can be associated with the position and speed of the simulated autonomous vehicle so that it moves into the correct position even if the characteristics of the simulated autonomous vehicle have changed. In this way, the scenario can continue to be used without needing to be adjusted constantly by a human programmer/designer when changes are made to the simulated autonomous vehicles.

Once the values for one or more parameters have been determined and any relationships between the parameters have been established, the simulation system can save the scenario data in a scenario data file. This file can include all required information for the environment, objects, and interactions between the objects, as well as the parameters, the discretized values, and the relationships between the parameters. This file can be used by a simulation system to simulate the scenario described within. In this way, any simulation system that can access the scenario data file can initiate a simulation of the scenario in a simulated environment.

In some examples, a scenario can be selected to be simulated. In response, the simulation system can generate a simulated sandbox in which the simulated autonomous vehicle is tested. The simulation sandbox can include an environment described the first layer of data (e.g., the scene layer that describes static features of the simulated environment (e.g., buildings, roads, signs, and so on)) and a plurality of objects based on the second layer (e.g., the object layer which includes pedestrians, other vehicles, and so on).

The simulator system can simulate an autonomous vehicle moving through that environment including simulating one or more interactions described by the third layer (e.g., the interaction layer) and the actions of one or more other objects, and so on. Thus, the simulation can simulate the experience of an autonomous vehicle moving through an actual live environment in the given scenario.

When parameters are chosen well, the generated scenarios can be used for a variety of different autonomous vehicle types and specifications. Similarly, as the autonomous vehicles themselves are updated with new software and capabilities, well-chosen parameters can allow the scenario to remain useful for evaluating the autonomous vehicle.

In some examples, the scenario can include information describing how the autonomous vehicle is expected to perform. For example, in a scenario in which another vehicle changes lanes into the same lane as the simulated autonomous vehicle, the scenario can include data describing that the simulated autonomous vehicle should keep a predetermined distance from the other vehicle.

The simulation system can track the distance (e.g., an object parameter) between the simulated autonomous vehicle and the other vehicle. If the distance remains above the predetermined distance threshold, the simulation system can determine that the autonomous vehicle has successfully completed the scenario.

The following provides an end-to-end example of the technology described herein. A simulation system can include a computing system. The computing system obtains scenario component data associated with a plurality of scenario components. The plurality of scenario components can include data describing an autonomous vehicle to be tested. The scenario components can include one or more objects (e.g., vehicles, pedestrians, bicycles, aerial vehicles) and one or more environment objects (buildings, signs, lane boundaries, and so on).

The computing system can obtain data identifying a plurality of parameters, each parameter in the plurality of parameters associated with a particular scenario component. A parameter associated with a particular scenario component can include one or more of a position, a velocity, a state, or a heading. In some examples, a parameter can represent a distance, an amount of time, a trigger describing when an event occurs, and so on. Furthermore, any value or state associated with the simulation of autonomous vehicle can be determined to be a parameter of the scenario.

In some examples, the data identifying the plurality of parameters can be received from a user. For example, a user (e.g., a scenario designer) can select one or more parameters from a plurality of attributes associated with a scenario component of the plurality of scenario components. For example, a designer may select the speed of an object as a parameter while not selecting the color of the object as a parameter for a given scenario.

Additionally, or alternatively, the computing system can automatically determine two or more parameters. For example, a machine-learned model can be trained (e.g., based on examples from human scenario designers) to take scenario data as input and produce output that identifies one or more parameters as relevant for the simulation.

In some examples, at least one of the parameters is associated with an intent of another vehicle within the scenario being communicated to the simulated autonomous vehicle during the simulation. For example, the parameter can represent the route that an object in the simulated scenario will take.

The computing system can determine values associated with a first set of parameters (e.g., independent parameters) in the plurality of parameters. For a particular parameter in the first set of parameters, the computing system determines a maximum value and a minimum value. The computing system can select, based on user input, one or more parameter values between the maximum value and the minimum value. For example, if the parameter is the speed of a vehicle making a turn, the computing system can identify both the highest allowable speed (e.g., 4 m/s) and a lowest allowable possible speed (e.g., 0.1 m/s).

The computing system can determine an increment value for the particular parameter. The computing system can generate a plurality of parameter values for the particular parameter by beginning with the minimum value and incrementing by the increment value until the maximum value is reached. Continuing the above example, the selected increment can be 0.1 m/s and a plurality of values are generated between the maximum value and the minimum value. Additionally, or alternatively, the computing system can generate a plurality of parameter values based on a particular statistical distribution of values. For example, a statistical distribution can be used to randomly generate values for a particular parameter. The process of defining one or more values for a particular parameter can be referred to as discretization.

The computing system can determine one or more parameter relationships, such that values associated with a second set of parameters (e.g., dependent parameters) in the plurality of parameters are determined, at least in part, based on the values associated with the plurality of parameters in the first set of parameters. For a respective parameter in the plurality of parameters, the computing system can assign the respective parameter to a first parameter value from the one or more parameter values associated with the respective parameter value. These values can be determined at build time or at run time. The computing system can adjust one or more parameters in the second set of parameter values based on the parameter value assigned to the respective parameter value.

The computing system can generate a scenario data file comprising data one or more scenario components, one or more parameters associated with one or more components, parameter values associated with the one or more parameters, and parameter relationships. A scenario data file can represent all the data necessary to initialize and run the simulated scenario. The scenario data file can be stored in a scenario database at the computing system or at a database at a remote server.

The computing system can initiate a simulation of a scenario based, at least in part on the values associated with the first set of the parameters and the one or more parameter relationships. The scenario can be based at least in part on the values associated with the first set of parameters and the values associated with the second set of parameters. The scenario can comprise a plurality of layers. The plurality of layers comprise a first layer indicative of a scene of the scenario, a second layer indicative of one or more objects in the scenario, and a third layer indicative of one or more interactions between the simulated autonomous vehicle at least one of the scene (e.g., the static objects that make up the environment) or the one or more objects.

The computing system can initiate another simulation of the scenario based, at least in part on a second version of the autonomous vehicle software, wherein the second version of the autonomous vehicle software is associated with values for the first set of the parameters that are different from the values associated with the first version of the autonomous vehicle software. The computing system can perform the scenario, wherein the scenario executes as intended because the relationships established between at least one of the first set of parameters and at least one of the second set of parameters.

The computing system can access the scenario data file in response to a selection by a user interacting with the computing system for a list of potential scenarios. The computing system can generate a scenario based on data included in the scenario data file. Once the scenario completes simulation, the computing system can determine based on one or more criteria whether the simulated autonomous vehicle has successfully completed the scenario.

Various means can be configured to perform the methods and processes described herein. For example, a computing system can include data obtaining units(s), parameter identification units(s), value determination units(s), parameter association unit(s), simulation unit(s), scenario evaluation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain scenario component data associated with a plurality of scenario components. For example, a computing system can access scenario component data from a user (e.g., scenario designer) or from a scenario component database stored in an accessible computing system. A data obtaining unit is one example of a means for obtaining scenario component data associated with a plurality of scenario components.

The means can be configured to obtain data identifying a plurality of parameters, each parameter in the plurality of parameters associated with a particular scenario component. For example, the plurality parameters can be supplied by a user (e.g., through user input to a user interface configured to allow designation of a plurality of parameters) or generated automatically. A parameter identification unit is one example of a means for obtaining data identifying a plurality of parameters, each parameter in the plurality of parameters associated with a particular scenario component.

The means can be configured to determine values associated with a first set of parameters in the plurality of parameters. For example, the computing system can select particular values or generate a range of potential values. A value determination unit is one example of a means for determining values associated with a first set of parameters in the plurality of parameters.

The means can be configured to determine one or more parameter relationships, such that values associated with a second set of parameters in the plurality of parameters are determined, at least in part, based on the values associated with the plurality of parameters in the first set of parameters. For example, the vehicle computing system can receive input from a user that determines relationships between a parameter in the first set of parameters and a parameter in the second set of parameters. A parameter association unit is one example of a means for determining one or more parameter relationships, such that values associated with a second set of parameters in the plurality of parameters are determined, at least in part, based on the values associated with the plurality of parameters in the first set of parameters.

The means can be configured to initiate a simulation of a scenario based, at least in part on the values associated with the first set of the parameters and the one or more parameter relationships. For example, the computing system can generate a simulation in which the autonomous vehicle is simulated and evaluated to determine whether the autonomous vehicle is performing the scenario in line with expectations. A simulation unit is one example of a means for initiating a simulation of a scenario based, at least in part on the values associated with the first set of the parameters and the one or more parameter relationships.

The means can be configured to determine based on one or more criteria whether the simulated autonomous vehicle has successfully completed the scenario. For example, the computing system can track one or more aspects of the simulation and compare it to evaluation criteria. A scenario evaluation unit is one example of a means for determining based on one or more criteria whether the simulated autonomous vehicle has successfully completed the scenario.

The systems and methods described herein provide a number of technical effects and benefits. Specifically, the systems and methods of the present disclosure provide improved techniques for evaluating the ability of autonomous vehicles using a simulation system. For instance, the simulation system (and its associated processes) allow a central service entity and/or a third-party entity (e.g., vehicle vendor) to create test scenarios for autonomous vehicles that do not need to be updated manually each time the autonomous vehicles (or other simulated components) are updated. As a result, including parametric modeling can improve the efficiency of a service entity, reducing development times and costs. In addition, improved simulation systems can improve the safety of the autonomous vehicles when they are deployed in the real-world.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WIFI access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects within the surrounding environment of the vehicle 105 based at least in part on the sensor data from the sensors 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 170B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 170B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can consider a route/route data when performing the motion planning function 170C.

The motion planning function 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning function 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectory. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back-passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of vehicle 105 can provide user input to adjust a destination location of vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., it's one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
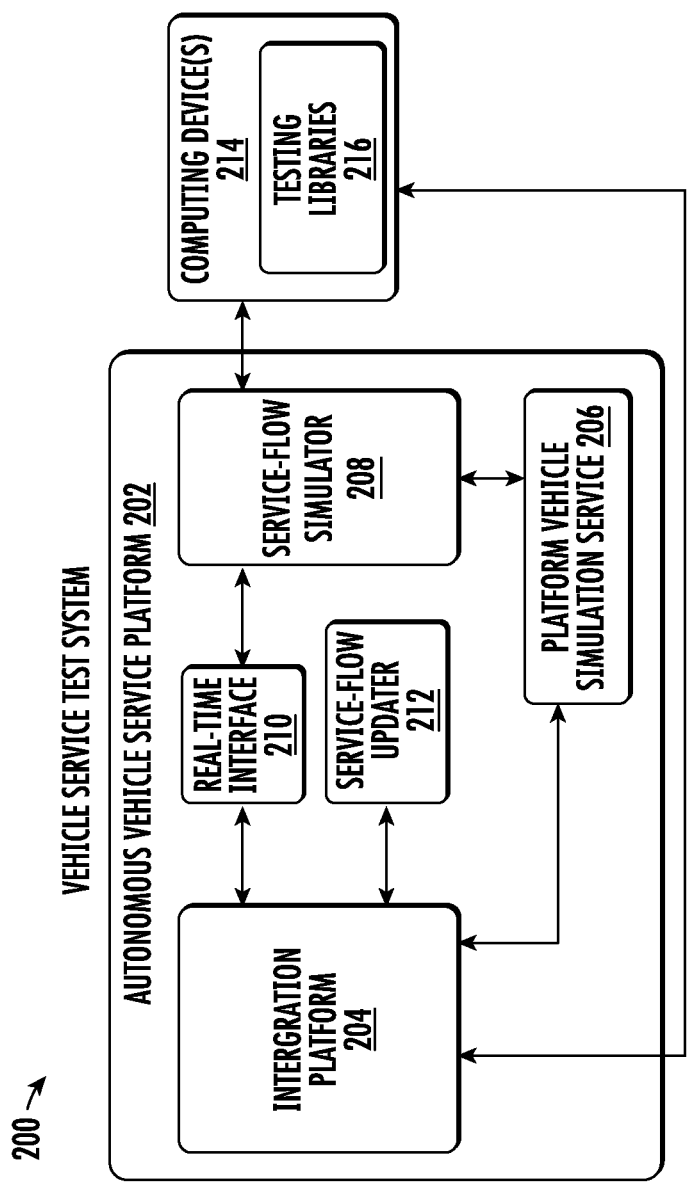
FIG. 2 depicts an example vehicle service test system infrastructure according to example embodiments of the present disclosure.

FIG. 2 depicts an example vehicle service test system 200 infrastructure according to example embodiments of the present disclosure. A vehicle service test system 200, as illustrated in FIG. 2, can provide for evaluation of autonomous vehicle services through computer-implemented simulations of vehicle service-flows that utilize autonomous vehicles. A vehicle service test system 200 can include an autonomous vehicle service platform 202, an integration platform 204, a platform vehicle simulation service 206, a service-flow simulator 208, a real-time interface 210, a service-flow updater 212, one or more remote computing devices 214, one or more testing libraries 216, and/or the like.

A vehicle service test system 200 can provide one or more interfaces that enable users (e.g., software developers for autonomous vehicle computing systems, etc.) to design and test vehicle services using simulated autonomous vehicles.

Data defining a simulated autonomous vehicle can be obtained in response to input received from a user through the one or more user interfaces. Similarly, data indicative of one or more parameters for at least one vehicle service simulation or scenario can be obtained, for example, in response to input received from a user through the one or more user interfaces. The vehicle service test system 200 may obtain from a remote computing system a request for an autonomous vehicle simulation. The vehicle service test system 200 can initiate one or more vehicle service simulations using the one or more parameters and the simulated autonomous vehicle. In this manner, users can define and debug vehicle service-flows within a single set of user interfaces. A user can manually control a vehicle service-flow in some examples by controlling an autonomous vehicle state. In other examples, a user can automate control of the vehicle service-flow using one or more predefined simulation scenarios. By providing a simulated testing environment that provides developer control over vehicle service-flows as well as autonomous vehicle definition, a quick and efficient technique for designing and evaluating vehicle service-flows can be provided.

The vehicle service test system 200 can be associated with an autonomous vehicle service platform 202. The autonomous vehicle service platform 202 can be associated with a service entity infrastructure which allows a service entity to provide vehicle services (e.g., transportation services (rideshare service), courier services, delivery services, etc.), for example, through vehicles in one or more vehicle fleets (e.g., service entity vehicle fleet, third-party vehicle fleet, etc.). For example, the autonomous vehicle service platform 202 can facilitate the generation of service assignments (e.g., indicative of the vehicle service type, origin location, destination location, and/or other parameters) to be performed by vehicles (e.g., within a fleet) in response to requests for vehicle services (e.g., from a user). In some implementations, the autonomous vehicle service platform 202 can be implemented as a portion of the operations computing system of the service entity and/or can be accessible by the operations computing system.

The autonomous vehicle service platform 202 can include integration platform 204 configured to integrate autonomous vehicles (e.g., autonomous computing systems) with the autonomous vehicle service platform 202. In some examples, the integration platform 204 is configured to integrate autonomous vehicles (e.g., autonomous vehicle 105 in FIG. 1) from different systems, such as from different vendors or providers of autonomous vehicles. The integration platform 204 enables multiple third-party systems to be integrated into a single autonomous vehicle service platform 202. Additionally, the integration platform 204 enables autonomous vehicles (e.g., autonomous vehicle 105 in FIG. 1) directly controlled by the operator of the autonomous vehicle service platform 202 to be integrated into a common service with autonomous vehicles (e.g., autonomous vehicle 105 in FIG. 1) from third-party systems.

The vehicle service test system 200 can include one or more vehicle simulation services. A vehicle simulation service can include one or more instances of a simulated autonomous vehicle (e.g., autonomous vehicle 105 in FIG. 1). For instance, a vehicle simulation service can be provided at the autonomous vehicle service platform 202 as a platform vehicle simulation service 206 in some examples. Additionally and/or alternatively, a vehicle simulation service can be implemented at a computing device (e.g., computing device 214, etc.) remote from the autonomous vehicle service platform 2020 as a local vehicle simulation service for example.

In some examples, a platform vehicle simulation service 206 can be implemented at the autonomous vehicle service platform 202, such as at the same set of servers and/or within the same network used to implement the autonomous vehicle service platform 202, for example. Such a platform vehicle simulation service 206 can include one or more instances of a simulated autonomous vehicle (e.g., autonomous vehicle 105 in FIG. 1). Each instance of the simulated autonomous vehicle (e.g., autonomous vehicle 105 in FIG. 1) can include an interface associated with the integration platform 204. A developer can provide data in association with the instance of the autonomous vehicle (e.g., autonomous vehicle 105 in FIG. 1) and data in association with the vehicle service simulation through the same interface. For example, a developer can access an interface for the simulator to initialize and/or modify a state of the simulated autonomous vehicle instance.

Additionally, the same interface may be used to dispatch, accept, and simulate a vehicle service using the autonomous vehicle (e.g., autonomous vehicle 105 in FIG. 1) instance. In this manner, a developer can use a graphical user interface such as a browser interface rather than a command line interface for controlling an autonomous vehicle (e.g., autonomous vehicle 105 in FIG. 1) instance. The simulator may include a vehicle simulation service client configured to communicate with the platform vehicle simulation service 206. For example, the vehicle simulation service client can communicate with the platform vehicle simulation service 206 to accept vehicle service requests and control the autonomous vehicle (e.g., autonomous vehicle 105 in FIG. 1) instance. A developer can also use the graphical user interface to create a specific scenario, including a plurality of specific steps for an autonomous vehicle to perform a service. The state of the autonomous vehicle (e.g., autonomous vehicle 105 in FIG. 1) instance can be stored and updated in the simulator interface and pushed to the platform vehicle simulation service 206. The platform vehicle simulation service 206 can be stateful and can route calls to the autonomous vehicle (e.g., autonomous vehicle 105 in FIG. 1) instance where the requested autonomous vehicle interface is running.

In some examples, a vehicle simulation service (e.g., platform vehicle simulation service 206) process may communicate with the integration platform 204 and simulation interfaces such as a service-flow simulator interface and/or vehicle simulator interface. In some examples, interfaces may be provided at one or more client computing devices (e.g., computing device 214, etc.). The vehicle simulation service process may include one or more endpoints (e.g., RPC endpoints) to facilitate communication with simulation interfaces (e.g., client computing devices using CLI and/or RPC).

The autonomous vehicle service platform 202 can include a service-flow simulator 208 configured as a tool for simulating service-flows using an autonomous vehicle (e.g., autonomous vehicle 105 in FIG. 1). The vehicle service test system 200 can obtain data indicative of one or more parameters for at least one vehicle service simulation. The parameters for a vehicle service simulation may include parameters that define a vehicle service-flow. For example, data defining a vehicle service-flow may define a dispatch of a vehicle service to an instance of a simulated autonomous vehicle (e.g., autonomous vehicle 105 in FIG. 1). Data defining the vehicle service-flow may also include data instructing the instance of the simulated autonomous vehicle (e.g., autonomous vehicle 105 in FIG. 1) to accept or reject the service request. The data may additionally include data indicative of service-flow updates and/or location updates. The data may indicate a route from a pick-up location to a drop-off location in example embodiments.

The autonomous vehicle service platform 202 can include a real-time interface 210 provided between the integration platform 204 and the service-flow simulator 208. A service request can be provided from the service-flow simulator 208 through the real-time interface 210 to the integration platform 204.

The autonomous vehicle service platform 202 can include a service-flow updater 212 that passes service-flow updates to and from the integration platform 204. Service-flow updates can be received at the integration platform 204 as a push notification from the service-flow updater 212. An update can be passed to the instance of the simulated autonomous vehicle (e.g., autonomous vehicle 105 in FIG. 1) corresponding to the service request. For example, an interface (e.g., SDK) inside the autonomous vehicle instance can establish a consistent connection (e.g., HTTP2) with the integration platform 204. A service request can be matched with the instance of the autonomous vehicle (e.g., autonomous vehicle 105 in FIG. 1) using a flag or other suitable identifier.

The vehicle service test system 200 can include one or more testing libraries 216 that can interface with the vehicle service test system 200 to provide for programmatically developing testing scenarios for running autonomous vehicle service simulations. For example, a developer can incorporate one or more testing libraries (e.g., a testing library 216) into code to programmatically control a test autonomous vehicle (e.g., autonomous vehicle 105 in FIG. 1) and/or vehicle service.

A testing library 216 can be used to interface with one or more simulation services and/or interface directly with an integration platform (e.g., integration platform 204). For example, one or more testing libraries (e.g., a testing library 216) may be used to interface with the autonomous vehicle service platform 202. In some examples, the vehicle service test system 200 may obtain data indicative of one or more parameters for at least one vehicle service simulation using one or more testing libraries (e.g., testing library 216). In some examples, service requests can be programmatically simulated via one or more testing libraries (e.g., testing library 216).

Instance(s) of a simulated autonomous vehicle (e.g., autonomous vehicle 105 in FIG. 1) can be deployed as a network service in some examples, such as at one or more servers in direct communication with the vehicle service test system 200. In other examples, the instances of the simulated autonomous vehicle can be deployed at a local computing device (e.g., computing device 214) remote from the vehicle service test system 200. The local computing device can be operated by the same entity that operates an autonomous vehicle service platform 202, or by a third-party entity. In either case, the vehicle service test system 200 can communicate with the simulated autonomous vehicle instances using various communication protocols. In some examples, each instance of a simulated autonomous vehicle may include an interface such as an interface programmed in a software development kit (SDK) that is similar to or the same as an interface (e.g., SDK) included within an actual autonomous vehicle used to provide the vehicle service. The interface may enable the vehicle service test system 200 to issue instructions to the autonomous vehicle (e.g., autonomous vehicle 105 in FIG. 1) instance to accept a service request, reject a service request, update the pose field of the autonomous vehicle (e.g., autonomous vehicle 105 in FIG. 1) instance, etc. In some examples, a user may deploy instances of a simulated autonomous vehicle (e.g., autonomous vehicle 105 in FIG. 1) using one or more test libraries (e.g., testing library 216).

In some implementations, a simulation may not involve a vehicle service-flow (e.g., the simulation of a vehicle service). For example, the simulation may aim to test the vehicle's ability to operate in a particular environment/scenario (as further described herein) without including a task/goal of initiating a vehicle service (e.g., picking-up and transporting a simulated rider for a simulated transportation service, etc.). As such, the service-flow simulator 208 may include other flow components/goals/checkpoints within an environment that are not associated with a vehicle service.

Figure 3:
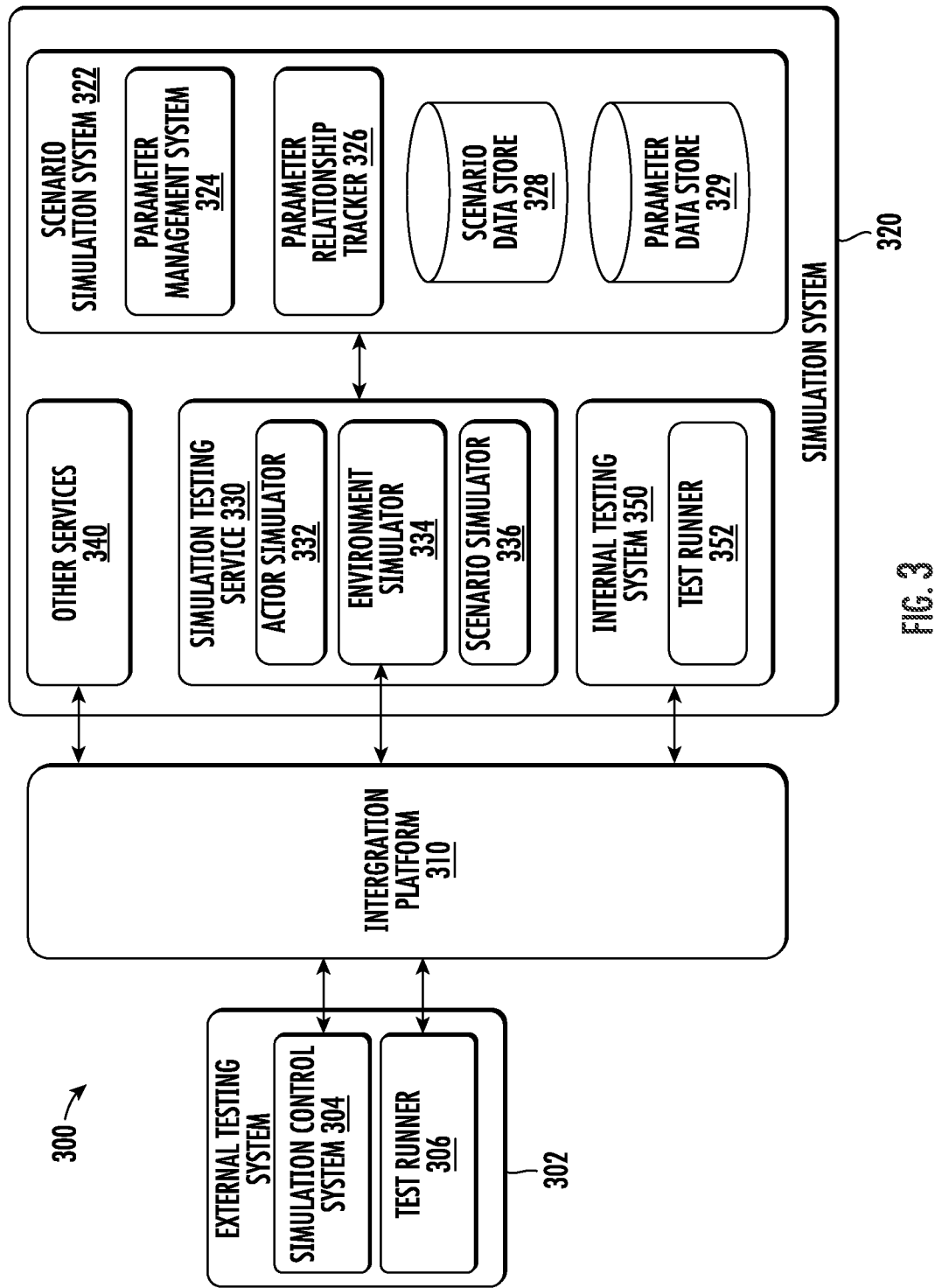
FIG. 3 depicts an example entity testing infrastructure according to example embodiments of the present disclosure.

FIG. 3 depicts an example entity testing infrastructure 300 according to example embodiments of the present disclosure. The entity testing infrastructure 300 includes an external testing system 302, an integration platform 310, and a simulation system 320. In some examples, the integration platform 310 can be integrated into the simulation system 320. In other examples, the integration platform 310 can be distinct from the simulation system 320 and will thus communicate to the simulation system 320 via a communication network (e.g., networks 120 in FIG. 1). The external testing system 302 can be a computing system associated with a third-party entity and can communicate with the integration platform 310 via a communication network (e.g., networks 120 in FIG. 1).

The external testing system 302 can include a simulation control system 304 and a test runner 306. The external testing system 302 can transmit one or more API calls (e.g., requests to perform an action at the simulation system 320 via an API available to the external testing system 302). The external testing system 302 can communicate any API calls to the integration platform 310 which can be a public-facing interface that allows external systems (third-party systems that are authorized) to submit requests and receive the results from the simulation system 320 or an internal-facing interface that permits only systems associated with the service entity to submit requests and receive the results from the simulation system 320. In some examples, the external testing system 302 can also simulate some or all of the simulation autonomous vehicle (e.g., autonomous vehicle 105 in FIG. 1) and its actions and transmit data describing the simulated autonomous vehicle to the simulation testing service 330 via the integration platform 310.

Specifically, the test runner 306 can send and receive data associated with a simulation to the simulation system 320 via the integration platform 310. The test runner 306 can, in response to user input, transmit a request to initiate a simulation at the simulation system 320. In some examples, the test runner 306 can submit information associated with initiating a simulation, including, but not limited to, a selected scenario, information describing the autonomous vehicle (e.g., autonomous vehicle 105 in FIG. 1) to be simulated, data associated with the simulation (e.g., the simulated scene), and so on.

The simulation control system 304 can allow a user to interact with the simulation to generate events or simulate an actor within the simulation. For example, a user associated with a third party can, as part of a scenario, direct the simulation system 320 to generate particular events, generate particular actions for one or more actors, and so on. The simulation control system 304 can also provide information to simulate an autonomous vehicle (e.g., autonomous vehicle 105 in FIG. 1). Thus, the autonomous vehicle (e.g., autonomous vehicle 105 in FIG. 1) can partially or wholly be simulated at the external testing system 302 and interact with the simulation system 320 via the integration platform 310.

In some implementations, the integration platform 310 can be a gateway that receives communication from external sources (e.g., external partner systems, autonomous vehicles, etc.). The integration platform 310 can provide APIs that allow external systems to submit requests to, and receive responses from, the simulation system 320. The integration platform 310 can validate requests (e.g., by requiring authentication information for the requesting party) before passing the requests to the simulation system 320 to ensure that all requests meet the requirements of the simulation system 320.

The simulation system 320 includes a simulation testing service 330, an internal testing system 350, other services system 340 for providing miscellaneous other services, and a scenario simulation system 322. The internal testing system 350 includes a test runner 352 that is used for initiating, controlling, monitoring, and analyzing the results of a simulation run by the simulation system 320. Internal testers (e.g., users associated with the service entity) can avoid sending requests to the integration platform 310. Instead, internal testers can use the test runner 352 to request that a simulation be initiated directly by interacting with the simulation testing service 330. The test runner 352 also allows testers to identify the specific autonomous vehicle (e.g., autonomous vehicle 105 in FIG. 1) that is to be simulated and provide parameters for the simulation, including but not limited to the location of the simulation, the number of simulated actors and their characteristics, the number and type of remote operators to be simulated, a specific scenario to be tested, and any specific events or variables to be generated.

While a simulation is being performed, a user can use the test runner 352 to monitor the simulation, provide input needed for specific events, and make on-the-fly alterations to the simulation or scenario as needed. The simulation system 320 can provide data representing the current state of the simulation (e.g., text, audio, or video) to the internal testing system 350 for a tester to view, as needed.

The simulation testing service 330 can include an actor simulator 332, an environment simulator 334, and a scenario simulator 336. The actor simulator 332 can simulate one or more actors within the simulation. For example, if a rider is needed to simulate a particular scenario, the actor simulator 332 can programmatically generate events as needed based on predefined scenario data. For example, if the predefined scenario data includes a rider submitting a ride request, the actor simulator 332 can automatically generate that event or cause the event to be generated at a time dictated by the predefined scenario. In some examples, the actor simulator 332 can interface with the scenario simulation system 322 to receive events and other information associated with one or more simulation scenarios. In addition, the simulation testing service 330 can transmit information about the simulation (including requests for remote operator assistance) to the scenario simulation system 322.

In other examples, the actor simulator 332 can include an API that allows users (either external users from the external testing system 302 or internal users from the internal testing system 350) to request specific events to be generated for the simulation. For example, a user can specify that a specific event (e.g., successful drop-off of a rider, a road blockage, a cut-off event, etc.) be generated at a particular time to test how the simulated autonomous vehicle (e.g., autonomous vehicle 105 in FIG. 1) will respond. In this way, a user can fully control and/or customize the specific situations that are tested by the simulation system 320.

In some implementations, an environment simulator 334 can generate a simulation sandbox in which the simulated autonomous vehicle (e.g., autonomous vehicle 105 in FIG. 1) is tested. The simulation sandbox can include a location that is being simulated (e.g., the scene), one or more other simulated entities within the sandbox (e.g., pedestrians, other vehicles, and so on), and static parts of the simulated environment (e.g., buildings, roads, signs, and so on). The environment simulator 334 can simulate an autonomous vehicle (e.g., autonomous vehicle 105 in FIG. 1) moving through that environment including simulating any needed physics, the actions of one or more other users, and so on. Thus, the sandbox can simulate the experience of an autonomous vehicle (e.g., autonomous vehicle 105 in FIG. 1) moving through an actual live environment.

A scenario simulator 336 can simulate one or more steps (or states) of a selected predefined scenario. Specifically, the scenario simulator 336 can receive scenario data from the scenario data store 328. The scenario data can include data describing a scenario can include a scene (e.g., details of the environments including the geographic location, the location of static obstacles and lane boundaries, etc.), one or more objects (e.g., the autonomous vehicle to be tested, other simulated actors (e.g., vehicles, bicyclists, animals, and so on), etc.), and one or more specific interactions planned to occur between the autonomous vehicle and by other simulated actors (e.g., other vehicles, pedestrians, and so on).

The scenario simulator 336 can ensure that any events that are required to be generated by the simulation system 320 (e.g., simulating riders or other actors in the environment) are generated in a timely manner. Similarly, the scenario simulator 336 can monitor the simulated autonomous vehicle (e.g., autonomous vehicle 105 in FIG. 1) to ensure that the simulated autonomous vehicle (e.g., autonomous vehicle 105 in FIG. 1) is performing actions described in the scenario data. For example, if the scenario describes the autonomous vehicle (e.g., autonomous vehicle 105 in FIG. 1) travelling at 50 mph down a road and then stopping to perform pick-up action, the scenario simulator 336 can, based on the scenario data, ensure that any necessary elements in the scenario are generated and placed correctly in the simulation.

The other services system 340 can provide a series of other services required by the simulation system 320, such as an internal actor simulator that serves to generate events for simulated riders and other actors in the environment.

A scenario simulation system 322 can include a parameter management system 324, a parameter relationship tracker 326, a scenario data store 328, and a parameter data store 329. In some examples, the scenario data store 328 stores data associated with a plurality of potential simulations that may be performed by the simulation system 320. When a simulation begins, the simulation system 320 can receive, in a request from a user, a selection of a particular scenario. The scenario simulation system 322 can generate one or more objects and scene elements based on the scenario data. The number and type of objects and scene elements can be determined, at least in part, based on the selected scenario. In some examples, data describing the number and type of simulated remote assistance operators can be stored in the scenario data store 328.

In some examples, the parameter management system 324 can receive, when generating scenario data, information associated with a particular scenario, including the objects included in the scenario, the scene of the scenario (e.g., the geographic location, static objects, lane boundaries, and so on), and one or more interactions to occur during the scenario. The parameter management system 324 can determine one or more parameters for the scenario. In some examples, the parameters are selected by one or more scenario designers and transmitted to the parameter management system 324 through a user interface. Additionally, or alternatively, the parameter management system 324 can determine one or more parameters automatically based on an analysis of the information associated with the scenario. For example, a machine-learned model can be trained to take scenario information as input and to output relevant parameters. In some examples, the process of determining parameters can be referred to as parameterization. The determined parameters can be stored in a parameter data store 329.

In some examples, the parameter management system 324 can determine one or more values for the parameters included in the parameter data store 329. Determining values (or a range of values) for a particular parameter can be referred to as discretization. For example, a user can define a range of values for a particular parameter and associate a particular probability distribution to use when generating values for a particular scenario. In other examples, the parameter management system 324 can include a minimum value, a maximum value, and an increment. The simulation testing service 330 can run a plurality of simulations, one simulation for each value starting at the minimum value and increasing by the increment until the maximum value is reached.

The parameter relationship tracker 326 can determine, for the plurality of parameters in a particular scenario, relationships between one or more first parameters and one or more second parameters, such that the one or more second parameter values are based, at least partially, on the one or more first parameter values. In this way, some of the parameters values are independent and controlled by the system or a designer, and some of the parameter values are dependent and vary based on the value of the independent values.

Once the values for one or more parameters have been determined and any relationships between the parameters have been established, the scenario simulation system 322 can save the scenario data in a scenario data file that can be stored in the scenario data store 328. This file can include all required information for the environment, objects, and interactions between the objects, as well as the parameters, the discretized values, and the relationships between the parameters. This file can be used by a simulation testing service 330 to simulate the scenario described within. In this way, any simulation system (e.g., 320) that can access the scenario data file can initiate a simulation of the scenario in a simulated environment.

In some examples, a scenario can be selected to be simulated. In response, the simulation testing service 330 can generate a simulated sandbox in which the simulated autonomous vehicle (e.g., autonomous vehicle 105 in FIG. 1) is tested. The simulation sandbox can include an environment described the first layer of data (e.g., the scene layer that describes static features of the simulated environment (e.g., buildings, roads, signs, and so on)) and a plurality of objects based on the second layer (e.g., the object layer which includes pedestrians, other vehicles, and so on).

The simulator testing system 330 can simulate an autonomous vehicle (e.g., autonomous vehicle 105 in FIG. 1) moving through that environment including simulating one or more interactions described by the third layer (e.g., the interaction layer) and the actions of one or more other objects, and so on. Thus, the simulation can simulate the experience of an autonomous vehicle (e.g., autonomous vehicle 105 in FIG. 1) moving through an actual live environment in the given scenario.

When parameters are chosen well, the generated scenarios can be used for a variety of different autonomous vehicle types and specifications. Similarly, as the autonomous vehicles (e.g., autonomous vehicle 105 in FIG. 1) themselves are updated with new software and capabilities, well-chosen parameters can allow the scenario to remain useful for evaluating the autonomous vehicle.

In some examples, each scenario stored in the scenario data store 328 can include information describing how the autonomous vehicle (e.g., autonomous vehicle 105 in FIG. 1) is expected to perform. For example, in a scenario in which another vehicle changes lanes into the same lane as the simulated autonomous vehicle (e.g., autonomous vehicle 105 in FIG. 1), the scenario can include data describing that the simulated autonomous vehicle (e.g., autonomous vehicle 105 in FIG. 1) should keep a predetermined distance from the other vehicle.

The simulation testing service 330 can track the distance (e.g., an object parameter) between the simulated autonomous vehicle (e.g., autonomous vehicle 105 in FIG. 1) and the other vehicle. If the distance remains above the predetermined distance threshold, the simulation testing service 330 can determine that the autonomous vehicle has successfully completed the scenario.

Figure 4:
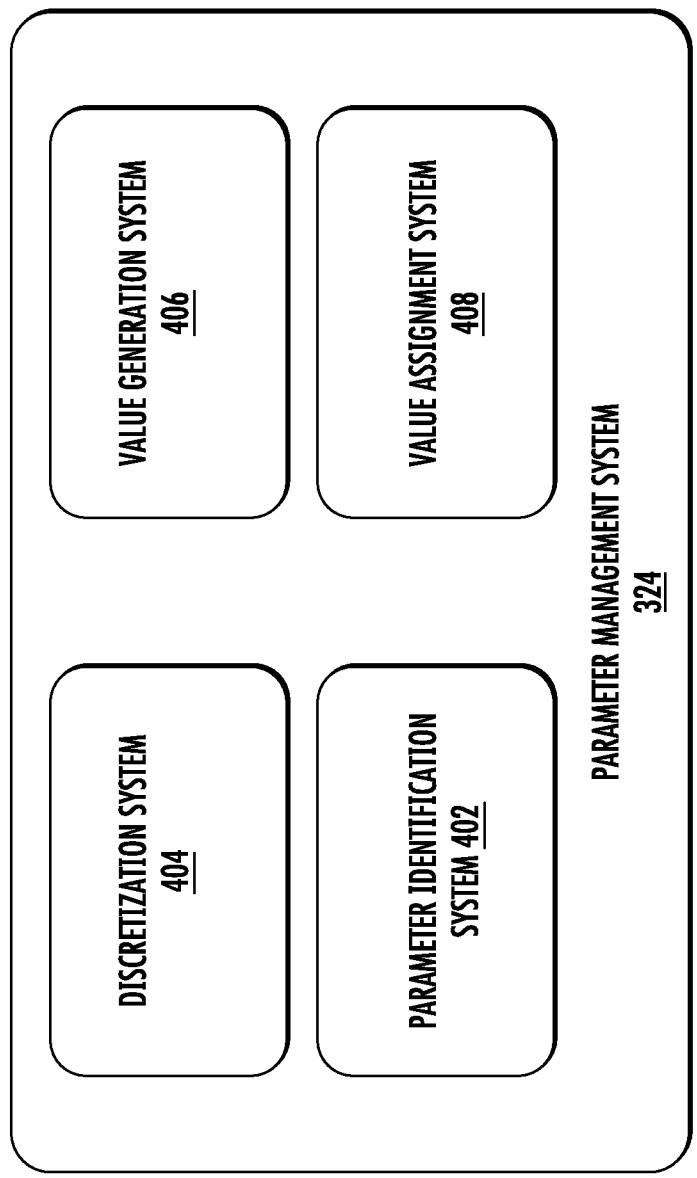
FIG. 4 depict an example of a parameter management system according to example embodiments of the present disclosure.

FIG. 4 depict an example of a parameter management system 324 according to example embodiments of the present disclosure. The parameter management system 324 can receive data associated with a scenario, including, but not limited to, scene, data, object data, and interaction data. To parameterize a scenario, the parameter identification system 402 can obtain a list of one or more scenario components. Scenario components can include the components of the environment, one or more objects in the scenario, and/or the interactions between the objects and/or environment. The parameter identification system 402 can determine a plurality of parameters associated with the scenario components. Parameters can be the set of measurable factors that define the scenario and determine its behavior and may be varied in the execution of the scenario.

Parameters can be organized into one or more general class types including, but not limited to, build-time parameters, run-time parameters, independent parameters, dependent parameters, object parameters, constrained parameters, and unconstrained parameters.

A build-time parameter can be a parameter that is assigned specific values when the scenario is initially created. For example, the simulated autonomous vehicle (e.g., autonomous vehicle 105 in FIG. 1) can be assigned an initial starting position. A runtime scenario parameter can be a parameter that is assigned at runtime (e.g., when the scenario is initialized). For example, the initial velocity and/or heading of the autonomous vehicle (e.g., autonomous vehicle 105 in FIG. 1) can be assigned at runtime to test different initial starting conditions.

Independent parameters can be parameters that are controlled by inputs. The first set of parameters in the scenario can be independent parameters. It should be noted that a particular parameter can have more than one class type. In some examples, independent parameters can also be either build-time parameters or run-time parameters. Dependent parameters can be parameters that are defined based on a relationship with an independent parameter. For example, if a scenario is designed to test the way an autonomous vehicle (e.g., autonomous vehicle 105 in FIG. 1) passes a slightly slower vehicle, the speed of the slower vehicle can be established to be 0.5 m/s slower than the simulated autonomous vehicle (e.g., autonomous vehicle 105 in FIG. 1). As such, the speed of the slower vehicle is a dependent parameter that relies on another parameter, the speed of the simulated autonomous vehicle (e.g., autonomous vehicle 105 in FIG. 1), to determine its value.

Objective parameters can be parameters that are sought to be optimized and are thus measured and evaluated. For example, a specific scenario can be designed to determine how close the autonomous vehicle (e.g., autonomous vehicle 105 in FIG. 1) comes to an object suddenly appearing into the road. The value generation system 406 can measure the distance between the autonomous vehicle (e.g., autonomous vehicle 105 in FIG. 1) and the object at all times to determine how close the autonomous vehicle comes to the object. Thus the distance between the two can be an objective parameter. This objective parameter can be evaluated to determine how well the simulated autonomous vehicle (e.g., autonomous vehicle 105 in FIG. 1) performed during the simulated scenario, such that if the distance between the object and the simulated autonomous vehicle is too small, the simulated autonomous vehicle (e.g., autonomous vehicle 105 in FIG. 1) can be determined to have failed the scenario.

Constrained parameters can be parameters that have bounded possible values. For example, the velocity of a particular vehicle can be bounded below a certain maximum speed. Unconstrained parameters can be unbounded. For example, the total distance traveled by the autonomous vehicle may be unbounded.

In addition, parameters can be associated with interactions, describing when and how objects and actors interact with the simulated autonomous vehicle. For example, a specific scenario can include testing whether the autonomous vehicle (e.g., autonomous vehicle 105 in FIG. 1) reacts appropriately to a vehicle in front of the autonomous vehicle (e.g., autonomous vehicle 105 in FIG. 1) suddenly stopping. Thus, an objective parameter can describe the distance between the autonomous vehicle (e.g., autonomous vehicle 105 in FIG. 1) and the lead vehicle when the lead vehicle suddenly stops and can be measured and compared to a threshold distance by the simulation system.

In some examples, the parameters can be designated and be received by the parameter identification system 402 via a communication interface (e.g., network 120 in FIG. 1). For example, a user can input a list of parameters into a user interface configured to allow parameters to be designated for a particular scenario. In other examples, the parameter identification system 402 can automatically generate parameters based on the scenario data (e.g., environment, objects, and interactions) of the scenario to be simulated. For example, the parameter identification system 402 can employ a machine-learned model that takes scenario data as input and outputs a list of potential parameters.

Once parameters have been determined, the discretization system 404 can discretize the parameters to obtain particular values. In some examples, a user can submit specific values. In other examples, the value generation system 406 can determine a range of potential values and generate a plurality of values by stepping through the range with a particular increment. In some examples, the value generation system 406 can generate values based on a specific statistical distribution within a particular range. For example, the speed of the autonomous vehicle (e.g., autonomous vehicle 105 in FIG. 1) can be a constrained parameter that is bounded within a range (e.g., 30 mph to 60 mph). The value generation system 406 can generate a plurality of values at 5 mph intervals within that range. The value assignment system 408 can use one or more of the plurality of values when executing the scenario (e.g., testing more than one initial value for a parameter (e.g., a run-time parameter) can require multiple instances of the scenario being run as the parameter can only be assigned one value for a given instance of the simulated scenario).

Some parameters (e.g., dependent parameters) can have a value associated with the values of one or more other parameters. For example, the distance between the autonomous vehicle (e.g., autonomous vehicle 105 in FIG. 1) and the actor when the actor enters the lane can be based, at least in part, on the speed of the autonomous vehicle (e.g., autonomous vehicle 105 in FIG. 1). Thus, one parameter can have a value that is based, at least in part, on the value associated with another parameter.

By associating some parameter values with other parameters rather than hardcoding their values, the parameter management system 324 can make each scenario more resilient to changes to the characteristics of one or more objects in the simulation. For example, if the autonomous vehicle (e.g., autonomous vehicle 105 in FIG. 1) being simulated changes such that the vehicle itself has a higher acceleration, the simulated autonomous vehicle (e.g., autonomous vehicle 105 in FIG. 1) may travel to a specific point more quickly. If an obstacle was hard-coded to move such that it obstructed the path at a particular time in the simulation, the faster vehicle may avoid the intended situation within the scenario altogether. This may cause the simulation to fail (or report failure) when no such failure has occurred. Using parametric modeling, the movement of the obstacle can be associated with the position and speed of the simulated autonomous vehicle so that it moves into the correct position even if the characteristics of the simulated autonomous vehicle have changed. In this way, the scenario can continue to be used without needing to be adjusted constantly by a human programmer/designer when changes are made to the simulated autonomous vehicles.

Figure 5A:
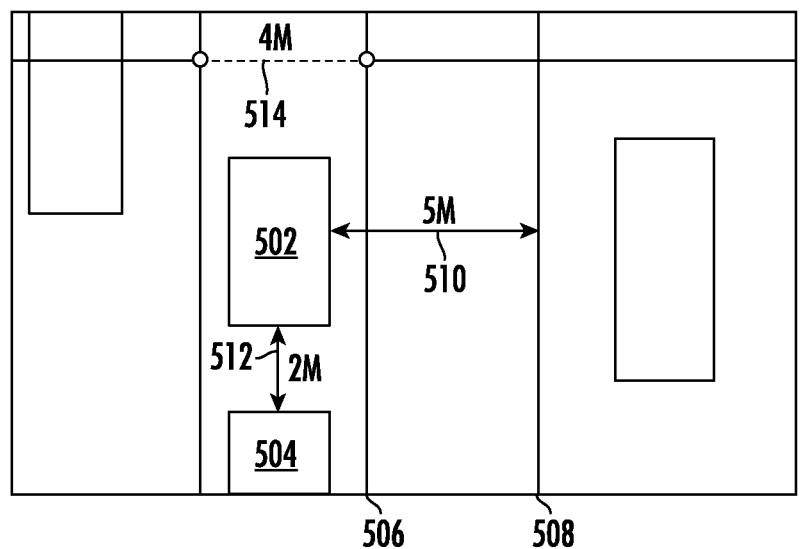
FIG. 5A depicts an example of a simulation of an autonomous vehicle interaction with another actor within a simulated environment according to example embodiments of the present disclosure.

FIG. 5A depicts an example of a simulation of an autonomous vehicle interaction with another actor within a simulated environment according to example embodiments of the present disclosure. In this example, the scenario includes the simulated autonomous vehicle 502 and another object (e.g., a following vehicle 504). The scene includes a lane with a centerline 506, and lane boundaries 508. Three parameters have been identified, the distance 514 between the lane boundary and the centerline, the distance between the autonomous vehicle 502 and the following vehicle 504 (measured as 512), and the distance between the simulated autonomous vehicle 502 and the far lane boundary 508.

These parameters have assigned values, with four (4) meters been assigned to the distance 514 between the lane boundaries and the centerline, two (2) meters being assigned to the distance between the autonomous vehicle 502 and the following vehicle 504, and five (5) meters being assigned to the distance between the autonomous vehicle 502 and the far boundary 508. In some examples, these values are set by a designer or generated by the simulations system. In other examples, one or more of these parameter values are dependent on the value of another parameter.

Figure 5B:
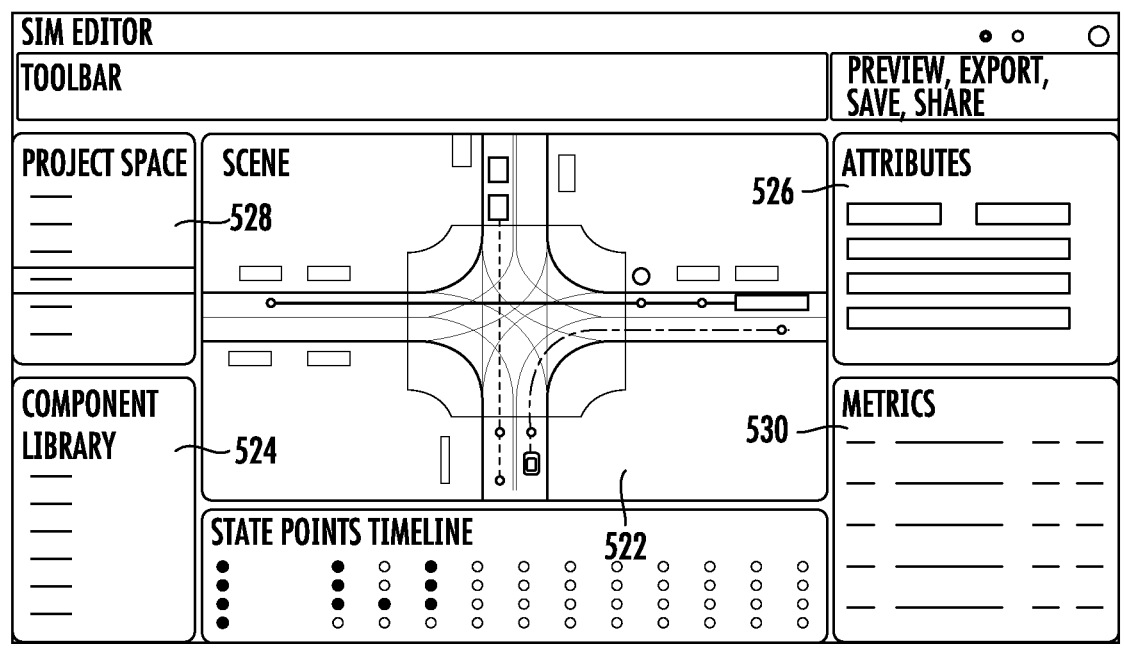
FIG. 5B depicts an example of an interface for generating a simulation scenario according to example embodiments of the present disclosure.

FIG. 5B depicts an example of an interface for generating a simulation scenario according to example embodiments of the present disclosure. This interface 520 can include a scenario visual representation area 522, a component library 524, an attribute display area 526, a project outline area 528, and a metric display area 530.

The scenario visual representation area 522 can include visual representations of the scene associated with the scenario (e.g., its location and any static components) and objects in the scenario (e.g., the autonomous vehicle (e.g., autonomous vehicle 105 in FIG. 1), other vehicles, and actors). The scenario visual representation area 522 can include information of future interactions or planned motion of one or more actors (e.g., their planned paths).

The component library 524 can include information describing the various components of the scenario. In some examples, the component library 524 can include information for scenario components that could optionally be added to the scenario. The attribute display area 526 can display one or more parameters associated with the scenario. In some examples, the attribute display area 526 can include information about the values of the parameters.

The project outline area 528 can include information associated with the scenario files that are generated as part of the scenario, including information about the scene, the objects, and the interactions associated with the scenario. The metric display area 530 can display one or more metric values that can be used to evaluate the current state of the scenario simulation or to determine whether the simulated autonomous vehicle (e.g., autonomous vehicle 105 in FIG. 1) meet one or more scenario criteria.

Figure 6:
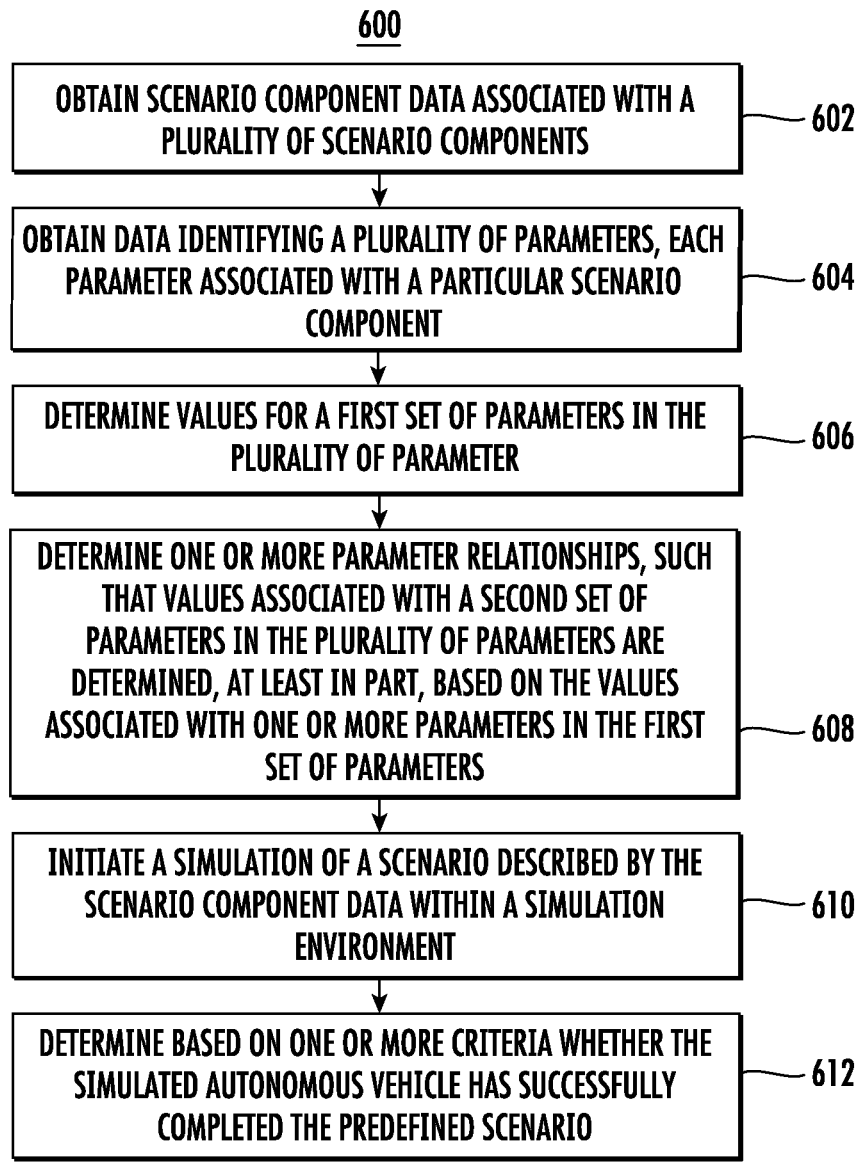
FIG. 6 depicts a flow diagram of an example method for predefined scenario simulations according to example embodiments of the present disclosure.

FIG. 6 depicts a flow diagram of an example method 600 for predefined scenario simulations according to example embodiments of the present disclosure. One or more portions of method 600 can be implemented by one or more computing devices such as, for example, a computing device associated with the simulation system (e.g., simulation system 320 of FIG. 3). One or more portions of the method 600 described herein can be implemented as an algorithm on the hardware components of the devices described herein (e.g., as in FIGS. 1, 3, 4, 7, 8) to, for example, generate scenarios using parametric modeling and conducting simulations to test autonomous vehicle (e.g., autonomous vehicle 105 in FIG. 1) using those generated scenarios. Although FIG. 6 depicts steps performed in a particular order for purposes of illustration and discussion, method 600 of FIG. 6 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

A simulation system (e.g., simulation system 320 in FIG. 3) can obtain, at 602, scenario component data associated with a plurality of scenario components. The plurality of scenario components can include data describing an autonomous vehicle (e.g., autonomous vehicle 105 in FIG. 1) to be tested. The scenario components can include one or more objects (e.g., vehicles, pedestrians, bicycles, aerial vehicles) and one or more environment objects (buildings, signs, lane boundaries, and so on).

The simulation system (e.g., simulation system 320 in FIG. 3) can obtain data, at 604, identifying a plurality of parameters, each parameter in the plurality of parameters associated with a particular scenario component. A parameter associated with a particular scenario component can include one or more of a position, a velocity, a state, or a heading. In some examples, a parameter can represent a distance, an amount of time, a trigger describing when an event occurs, and so on.

In some examples, the data identifying the plurality of parameters can be received from a user. For example, a user (e.g., a scenario designer) can select one or more parameters from a plurality of attributes associated with a scenario component of the plurality of scenario components. For example, a test designer may select the speed of an object as a parameter while not selecting the color of the object as a parameter for a given scenario.

Additionally, or alternatively, the simulation system (e.g., simulation system 320 in FIG. 3) can automatically determine two or more parameters. For example, a machine-learned model can be trained (e.g., based on examples from human scenario designers) to take scenario data as input and produce output that identifies one or more parameters as relevant for the simulation.

In some examples, at least one of the parameters is associated with an intent of another vehicle within the scenario being communicated to the simulated autonomous vehicle (e.g., autonomous vehicle 105 in FIG. 1) during the simulation. For example, the parameter can represent the route that an object in the simulated scenario will take.

The simulation system (e.g., simulation system 320 in FIG. 3) can, at 606, determine values associated with a first set of parameters (e.g., independent parameters) in the plurality of parameters. For a particular parameter in the first set of parameters, the simulation system (e.g., simulation system 320 in FIG. 3) can determine a maximum value and a minimum value. The simulation system (e.g., simulation system 320 in FIG. 3) can select, based on user input, one or more parameter values between the maximum value and the minimum value. For example, if the parameter is the speed of a vehicle making a turn, the simulation system (e.g., simulation system 320 in FIG. 3) can identify both the highest allowable speed (e.g., 4 m/s) and an allowable possible speed (e.g., 0.1 m/s).

The simulation system (e.g., simulation system 320 in FIG. 3) can determine an increment value for the particular parameter. The simulation system (e.g., simulation system 320 in FIG. 3) can generate a plurality of parameter values for the particular parameter by beginning with the minimum value and incrementing by the increment value until the maximum value is reached. Continuing the above example, the selected increment can be 0.1 m/s and a plurality of values are generated between the maximum value and the minimum value. Additionally, or alternatively, the simulation system (e.g., simulation system 320 in FIG. 3) can generate a plurality of parameter values based on a particular statistical distribution of values between the maximum value and the minimum value. The process of defining one or more values for a particular parameter can be referred to as discretization.

The simulation system (e.g., simulation system 320 in FIG. 3) can, at 608, determine one or more parameter relationships, such that values associated with a second set of parameters (e.g., dependent parameters) in the plurality of parameters are determined, at least in part, based on the values associated with the plurality of parameters in the first set of parameters. For a respective parameter in the plurality of parameters, the simulation system (e.g., simulation system 320 in FIG. 3) can assign the respective parameter to a first parameter value from the one or more parameter values associated with the respective parameter value. These values can be determined at build time or at run time. The simulation system (e.g., simulation system 320 in FIG. 3) can adjust one or more parameters in the second set of parameter values based on the parameter value assigned to the respective parameter value.

The simulation system (e.g., simulation system 320 in FIG. 3) can generate a scenario data file comprising data one or more scenario components, one or more parameters associated with one or more components, parameter values associated with the one or more parameters, and parameter relationships. A scenario data file can represent all the data necessary to initialize and run the simulated scenario. The scenario of data file can be stored in a scenario database (e.g., scenario data store 328 in FIG. 3) at the computing system or at a database at a remote server.

The simulation system (e.g., simulation system 320 in FIG. 3) can, at 610, initiate a simulation of a scenario based, at least in part on the values associated with the first set of the parameters and the one or more parameter relationships. The scenario can be based at least in part on the values associated with the first set of parameters and the values associated with the second set of parameters. The scenario can comprise a plurality of layers. The plurality of layers comprise a first layer indicative of a scene of the scenario, a second layer indicative of one or more objects in the scenario, and a third layer indicative of one or more interactions between the simulated autonomous vehicle at least one of the scene (e.g., the static objects that make up the environment) or the one or more objects.

The simulation system (e.g., simulation system 320 in FIG. 3) can initiate another simulation of the scenario based, at least in part on a second version of the autonomous vehicle software, wherein the second version of the autonomous vehicle software is associated with values for the first set of the parameters that are different from the values associated with the first version of the autonomous vehicle software. The simulation system (e.g., simulation system 320 in FIG. 3) can perform the scenario, wherein the scenario executes as intended because the relationships established between at least one of the first set of parameters and at least one of the second set of parameters.

The simulation system (e.g., simulation system 320 in FIG. 3) can access the scenario data file in response to a selection by a user interacting with the computing system for a list of potential scenarios. The simulation system (e.g., simulation system 320 in FIG. 3) can generate a scenario based on data included in the scenario data file. Once the scenario completes simulation, the simulation system (e.g., simulation system 320 in FIG. 3) can, at 612, determine based on one or more criteria whether the simulated autonomous vehicle (e.g., autonomous vehicle 105 in FIG. 1) has successfully completed the scenario.

Figure 7:
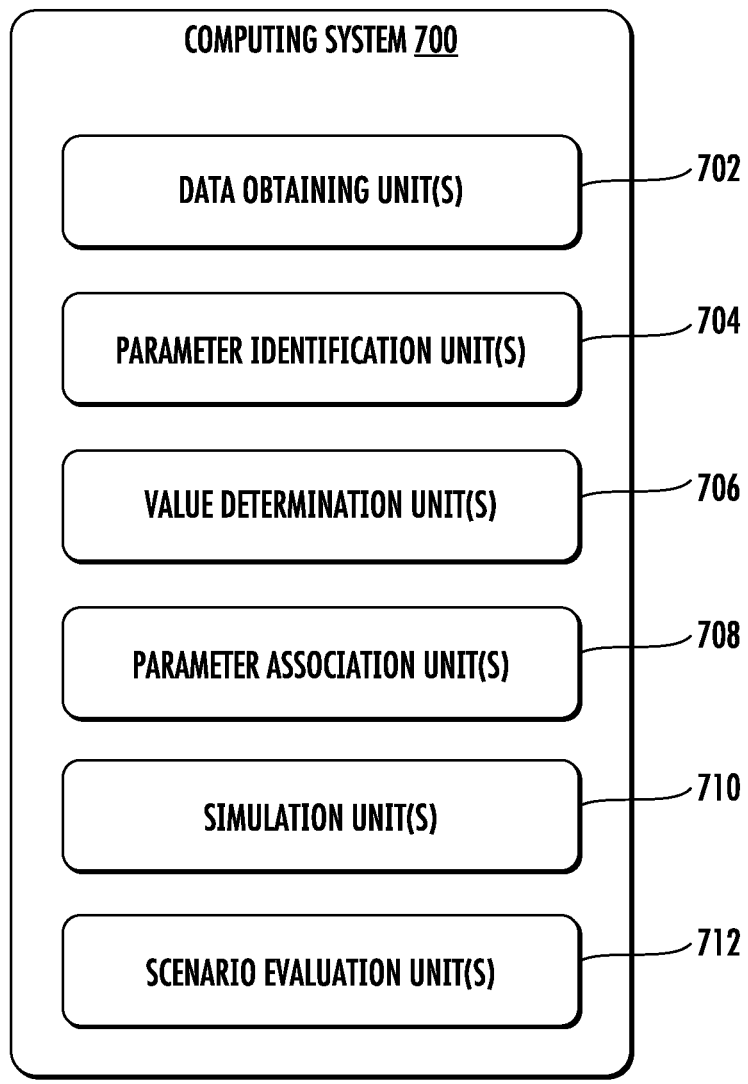
FIG. 7 depicts an example system with units for performing operations and functions according to example aspects of the present disclosure.

FIG. 7 depicts an example system with units for performing operations and functions according to example aspects of the present disclosure. Various means can be configured to perform the methods and processes described herein. For example, a computing system can include data obtaining units(s) 702, parameter identification units(s) 704, value determination units(s) 706, parameter association unit(s) 708, simulation unit(s) 710, scenario evaluation unit(s) 712, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain scenario component data associated with a plurality of scenario components. For example, a computing system can access scenario component data from a user (e.g., scenario designer) or from a scenario component database stored in an accessible computing system. A data obtaining unit 702 is one example of a means for obtaining scenario component data associated with a plurality of scenario components.

The means can be configured to obtain data identifying a plurality of parameters, each parameter in the plurality of parameters associated with a particular scenario component. For example, the plurality parameters can be supplied by a user (e.g., through user input to a user interface configured to allow designation of a plurality of parameters) or generated automatically. A parameter identification unit 704 is one example of a means for obtaining data identifying a plurality of parameters, each parameter in the plurality of parameters associated with a particular scenario component.

The means can be configured to determine values associated with a first set of parameters in the plurality of parameters. For example, the computing system can select particular values or generate a range of potential values. A value determination unit 706 is one example of a means for determining values associated with a first set of parameters in the plurality of parameters.

The means can be configured to determine one or more parameter relationships, such that values associated with a second set of parameters in the plurality of parameters are determined, at least in part, based on the values associated with the plurality of parameters in the first set of parameters. For example, the vehicle computing system can receive input from a user that determines relationships between a parameter in the first set of parameters and a parameter in the second set of parameters. A parameter association unit 708 is one example of a means for determining one or more parameter relationships, such that values associated with a second set of parameters in the plurality of parameters are determined, at least in part, based on the values associated with the plurality of parameters in the first set of parameters.

The means can be configured to initiate a simulation of a scenario based, at least in part on the values associated with the first set of the parameters and the one or more parameter relationships. For example, the computing system can generate a simulation in which the autonomous vehicle is simulated and evaluated to determine whether the autonomous vehicle is performing the scenario in line with expectations. A simulation unit 710 is one example of a means for initiating a simulation of a scenario based, at least in part on the values associated with the first set of the parameters and the one or more parameter relationships.

The means can be configured to determine based on one or more criteria whether the simulated autonomous vehicle has successfully completed the scenario. For example, the computing system can track one or more aspects of the simulation and compare it to evaluation criteria. A scenario evaluation unit 712 is one example of a means for determining based on one or more criteria whether the simulated autonomous vehicle has successfully completed the scenario.

Figure 8:
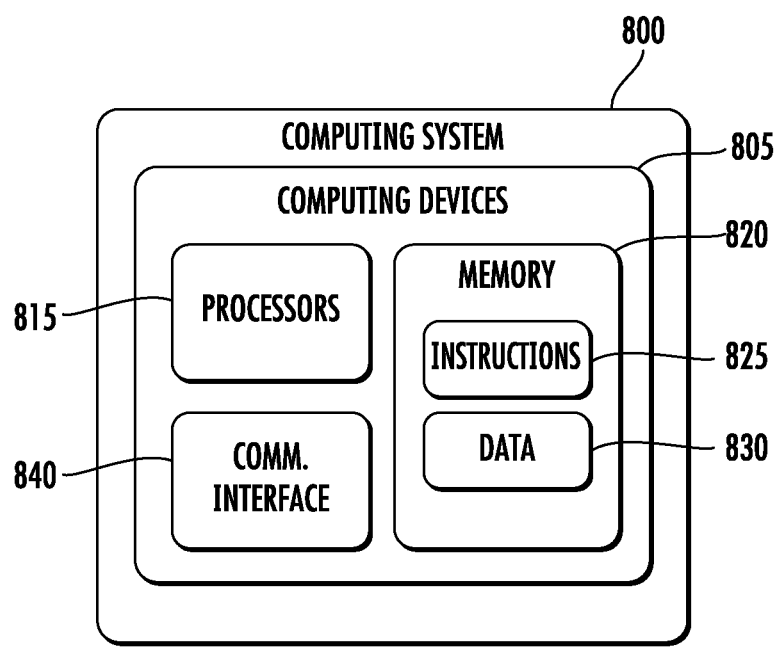
FIG. 8 depicts example system components according to example aspects of the present disclosure.

FIG. 8 depicts example system components according to example aspects of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The computing system 800 can be and/or include the vehicle computing system 110 of FIG. 1 or simulation system 320 of FIG. 3. The computing system 800 can be associated with an operations system and/or an entity associated with the vehicle 105 such as, for example, a vehicle owner, vehicle manager, fleet operator, service provider, etc.

The computing device(s) 805 of the computing system 800 can include processor(s) 815 and at least one memory 820. The one or more processors 815 can be any suitable processing device (e.g., a processor core, a microprocessor, an ASIC, an FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, magnetic disks, data registers, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815

For example, the memory 820 on-board the vehicle 105 can store instructions 825 that when executed by the one or more processors 815 cause the one or more processors 815 (e.g., in the vehicle computing system 110) to perform operations such as any of the operations and functions of the computing device(s) 805 and/or vehicle computing system 110 (and its sub-systems (e.g., the perception, prediction, motion planner systems, etc.)), any of the operations and functions for which the vehicle computing system 110 (and/or its subsystems) are configured, any portions of the methods described herein, and/or any other operations and functions described herein. Memory for a system offboard a vehicle can store instructions to perform any operations and functions of the offboard systems described herein and/or the operations and functions of the autonomous vehicle (its computing system), methods, and/or any other operations and functions described herein.

The memory 820 can store data 830 that can be obtained (e.g., received, accessed, written, manipulated, created, generated, etc.) and/or stored. The data 830 can include, for instance, services data (e.g., trip data, route data, user data, etc.), sensor data, map data, perception data, prediction data, scenario data, parameter data, criteria data, value data, scene data, object data, relationship data, interaction data, and/or other data/information as described herein. In some implementations, the computing device(s) 805 can obtain data from one or more memories that are remote from the autonomous vehicle 105.

The computing device(s) 805 can also include a communication interface 840 used to communicate with one or more other system(s) (e.g., the remote computing system). The communication interface 840 can include any circuits, components, software, etc. for communicating via one or more networks (e.g., network(s)). In some implementations, the communication interface 840 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for autonomous vehicle simulation, the method comprising:
   obtaining, by a computing system comprising one or more processors, scenario component data associated with a plurality of scenario components;
   obtaining, by the computing system, data identifying a plurality of parameters, each parameter in the plurality of parameters associated with a particular scenario component;
   determining, by the computing system, values associated with a first set of parameters in the plurality of parameters, wherein determining values associated with a first set of parameters in the plurality of parameters further comprises:
   for a particular parameter in the first set of parameters:
      determining, by the computing system, a maximum value; and
      determining, by the computing system, a minimum value;

determining, by the computing system, one or more parameter relationships, such that values associated with a second set of parameters in the plurality of parameters are determined, at least in part, based on the values associated with the plurality of parameters in the first set of parameters;

performing, by the computing system, a simulation of a scenario based, at least in part, on the values associated with the first set of the parameters and the one or more parameter relationships;

determining, by the computer system, based on one or more criteria whether a simulated autonomous vehicle has successfully completed the scenario during the simulation; and updating, by the computing system, a control system of one or more autonomous vehicles based on whether the simulated autonomous vehicle successfully completed the scenario.

2. The computer-implemented method of claim 1, wherein the scenario comprises a plurality of layers.

3. The computer-implemented method of claim 2, wherein the plurality of layers comprise a first layer indicative of a scene of the scenario, a second layer indicative of one or more objects in the scenario, and a third layer indicative of one or more interactions between the simulated autonomous vehicle at least one of the scene or the one or more objects.

4. The computer-implemented method of claim 1, wherein the plurality of scenario components includes data describing an autonomous vehicle to be tested.

5. The computer-implemented method of claim 1, wherein the simulation of the scenario is run based at least in part on a first version of autonomous vehicle software, and wherein the method further comprises:

initiating, by the computing system, another simulation of the scenario based, at least in part on a second version of the autonomous vehicle software, wherein the second version of the autonomous vehicle software is associated with values for the first set of the parameters that are different from the values associated with the first version of the autonomous vehicle software; and performing, by the computing system, the scenario, wherein the scenario executes as intended because the relationships established between at least one of the first set of parameters and at least one of the second set of parameters.

6. The computer-implemented method of claim 1, further comprising:

generating, by the computing system, a scenario data file comprising one or more scenario components, one or more parameters associated with one or more components, parameter values associated with the one or more parameters, and one or more parameter relationships.

7. The computer-implemented method of claim 6, wherein initiating, by the computing system, a simulation of a scenario based, at least in part on the values associated with the first set of the parameters and the one or more parameter relationships further comprises:

accessing, by the computing system, the scenario data file; and generating, by the computing system, the scenario based on data included in the scenario data file.

8. The computer-implemented method of claim 1, wherein a parameter associated with a particular scenario component can include at least one of a position, a velocity, a state, or a heading.

9. The computer-implemented method of claim 1, wherein the data identifying the plurality of parameters are received from a user.

10. The computer-implemented method of claim 1, wherein obtaining data identifying the plurality of parameters comprises automatically determining two or more parameters by a computing system associated with the simulation.

11. The computer-implemented method of claim 1, wherein determining, by the computing system, values for a first set of parameters in the plurality of parameters further comprises:

selecting, by the computing system and based on user input, one or more parameter values between the maximum value and the minimum value.

12. The computer-implemented method of claim 11, wherein determining, by the computing system, values for a first set of parameters in the plurality of parameters further comprises:

determining, by the computing system, an increment value for the particular parameter; and generating, by the computing system, a plurality of parameter values for the particular parameter by beginning with the minimum value and incrementing by the increment value until the maximum value is reached.

13. The computer-implemented method of claim 11, wherein determining, by the computing system, values for a first set of parameters in the plurality of parameters further comprises:

generating, by the computing system, a plurality of parameter values based on a statistical distribution of values.

14. The computer-implemented method of claim 11, wherein initiating, by the computing system, a simulation of a scenario described by the scenario component data within a simulation environment further comprises:

for a respective parameter in the plurality of parameters:
assigning, by the computing system, the respective parameter to a first parameter value from the one or more parameter values associated with the respective parameter value;

adjusting, by the computing system, one or more parameters in the second set of parameter values based on the parameter value assigned to the respective parameter value; and performing, by the computing system, the simulation scenario.

15. The computer-implemented method of claim 1, wherein at least one of the parameters is associated with an intent of another vehicle within the scenario being communicated to the simulated autonomous vehicle during the simulation.

16. The computer-implemented method of claim 1, wherein the simulated autonomous vehicle is a simulated truck.

17. The computer-implemented method of claim 1, wherein the one or more criteria are based on one or more metrics that measure a state of the scenario simulation.

18. A computing system for parametric simulation for autonomous vehicles comprising:

one or more processors; and one or more tangible, non-transitory, computer readable media that collectively store instructions that when executed by the one or more processors cause the computing system to perform operations comprising:

obtaining scenario component data associated with a plurality of scenario components;

obtaining data identifying a plurality of parameters, each parameter associated with a particular scenario component;

determining values for a first set of parameters in the plurality of parameters, wherein determining values for a first set of parameters in the plurality of parameters further comprises:

for a particular parameter in the first set of parameters:
determining a maximum value; and
determining a minimum value;

determining one or more parameter relationships, such that values associated with a second set of parameters in the plurality of parameters are determined, at least in part, based on the values associated with one or more parameters in the first set of parameters;

performing a simulation of a scenario based, at least in part, on the values associated with the first set of the parameters and the one or more parameter relationships;

determining based on one or more criteria whether a simulated autonomous vehicle has successfully completed the scenario during the simulation; and updating, by the computing system, a control system of one or more autonomous vehicles based on whether the simulated autonomous vehicle successfully completed the scenario.

19. The computing system of claim 18, wherein determining values for a first set of parameters in the plurality of parameter further comprises:

selecting, based on user input, one or more parameter values between the maximum value and the minimum value.

20. A non-transitory computer-readable medium storing instruction that, when executed by one or more computing devices, cause the one or more computing devices to perform operations, the operations comprising:

obtaining scenario component data associated with a plurality of scenario components;

obtaining data identifying a plurality of parameters, each parameter associated with a particular scenario component;

determining values for a first set of parameters in the plurality of parameters, wherein determining values for a first set of parameters in the plurality of parameters further comprises:

for a particular parameter in the first set of parameters:
determining a maximum value; and
determining a minimum value;

determining one or more parameter relationships, such that values associated with a second set of parameters in the plurality of parameters are determined, at least in part, based on the values associated with one or more parameters in the first set of parameters;

performing a simulation of a scenario based, at least in part, on the values associated with the first set of the parameters and the one or more parameter relationships; and determining based on one or more criteria whether a simulated autonomous vehicle has successfully completed the scenario during the simulation; and updating, by the computing system, a control system of one or more autonomous vehicles based on whether the simulated autonomous vehicle successfully completed the scenario.

* * * * *

UNITED STATES PATENT AND TRADEMARK OFFICE
CERTIFICATE OF CORRECTION

| | | |
|---|---|---|
| PATENT NO. | : 11,893,323 B2 | Page 1 of 1 |
| APPLICATION NO. | : 17/092237 | |
| DATED | : February 6, 2024 | |
| INVENTOR(S) | : Letwin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this
First Day of July, 2025

Coke Morgan Stewart
*Acting Director of the United States Patent and Trademark Office*